(12) United States Patent
Huff (10) Patent No.: US 10,055,914 B2
(45) Date of Patent: Aug. 21, 2018

(54) MONITORING AND CONTROL OF TURNSTILES

(71) Applicant: INTEGRATED DESIGN LIMITED, Feltham, Middlesex (GB)

(72) Inventor: Derek Huff, Feltham (GB)

(73) Assignee: INTEGRATED DESIGN LIMITED, Feltham, Middlesex (GB)

( * ) Notice: Subject to any disclaimer, the term of this patent is extended or adjusted under 35 U.S.C. 154(b) by 0 days.

(21) Appl. No.: 15/441,856

(22) Filed: Feb. 24, 2017

(65) Prior Publication Data

US 2017/0243415 A1  Aug. 24, 2017

(30) Foreign Application Priority Data

Feb. 24, 2016  (GB) .................................... 1603212.0
Jun. 21, 2016  (GB) .................................... 1610777.3

(51) Int. Cl.
  G06K 5/00  (2006.01)
  G07C 9/00  (2006.01)
  H04N 7/18  (2006.01)
  H04N 5/232  (2006.01)

(52) U.S. Cl.
  CPC ..... G07C 9/00071 (2013.01); H04N 5/23206 (2013.01); H04N 7/181 (2013.01)

(58) Field of Classification Search
  CPC . G07C 9/00071; H04N 5/23206; H04N 7/181
  USPC .............................. 235/382, 382.5, 375, 384
  See application file for complete search history.

(56) References Cited

U.S. PATENT DOCUMENTS

| | | | |
|---|---|---|---|
| 9,784,032 B2 * | 10/2017 | Perkins | .................. E06B 11/08 |
| 2006/0061450 A1 | 3/2006 | Tibi et al. | |
| 2014/0226019 A1 | 8/2014 | Artino et al. | |
| 2015/0154446 A1 * | 6/2015 | Masood | ............. G06K 9/00221 382/117 |

FOREIGN PATENT DOCUMENTS

WO   2014181106   11/2014

OTHER PUBLICATIONS

Search Report—Corresponding GB Application No. 1610777.3, dated Aug. 25, 2016, 1 page.
Combined Search and Examination Report—Corresponding GB Application No. 1603212.0, dated Apr. 14, 2016, 3 pages.

* cited by examiner

*Primary Examiner* — Karl D Frech
(74) *Attorney, Agent, or Firm* — Leber IP Law; Dennis R. Haszko (57) ABSTRACT

Turnstile apparatus comprising a plurality of turnstile lanes, a camera mounted to view the lanes in its field of view and a remote controller, connected over a network to the camera and lanes, the controller having a display associated with it and means for controlling operation of the lanes, the camera being adapted to transmit video images of its field of view to the controller; the controller being adapted to display the video from the camera and further adapted to generate buttons, each button being associatable with a particular lane, the button being moveable to a position on the screen where it is in the vicinity of the lane, wherein operation of the button by a user controls operation of its associated lane, including operating a barrier, forming part of the lane, to open.

17 Claims, 6 Drawing Sheets

MONITORING AND CONTROL OF TURNSTILES

This invention relates to monitoring of and control of turnstiles. A turnstile is an entry portal of the type which has means defining a channel through which a person must pass and which generally has one or more glass or other panels which can be rotated between a first position where persons may not pass and a second position where persons may pass. Such entrance control panels or turnstiles may be installed in a corporate foyer, for example, for the purpose of monitoring and controlling the movement of people into and out of a defined secured space.

Turnstiles in this situation are typically integrated to an access control system equipped with software and hardware such that an authorised person can present a token to a card reader installed at the turnstile. When the token has been validated by the software a signal is sent to the turnstile to allow the passage of the authorised person through the turnstile.

Sometimes passage in either or both directions can be facilitated without the use of a token and sometimes there is provision for other authorisation means (say) for visitors or other people who may not have a token. Often this additional means is operated by security staff in the foyer itself who can see the person wishing to gain entry and are themselves providing the authorising means. For example, they may recognise a known visitor. In this case the means by which a security officer can signal to the turnstile that it is to allow entry or exit can be as simple as a momentary switch directly connected by a pair of wires to the turnstile.

Recently more sophisticated 'remote controller' means have been provided including arrangements for signalling multiple turnstiles using multiple switches, computers etc. Sometimes the communication path to the turnstile from such devices is simple, sometimes it is more complex, multiplexed and addressed. Some turnstiles can be monitored and controlled by TCP/IP type network communications or others. It follows with increased sophistication that the ability to report information eg alarms, status and the like from turnstiles back to the controller is also possible. In this way when there is for instance a security violation at a portal then a display on the controller can indicate this event. Very often for a multi turnstile controller the lanes will appear as icons on a 'mimic' display or computer generated graphic representations on a computer type screen.

In a situation as described above, there are a number of difficulties. In a multi-turnstile installation it can be difficult for a security officer to quickly relate the controller display to the actual position of turnstiles in a foyer. Very often the schematic controller displays are plan view and not the view that the security officer can see. There are often visual obstructions including people between the security officer such that when there is an alarm or the need to manually authorise a person through a turnstile it can be difficult to quickly identify the turnstile in question. Also because of the speed at which people move in a sometimes crowded foyer it can be difficult to identify the cause of an alarm and the person responsible.

Visual observation is not always possible and can be inhibited by distance, a number of people blocking the way or other factors. Physical distinction of a lane, either by marking it with a number, lighting it in a specific manner, altering its position to conform with some specified layout relative to a group (of other lanes) or any other physical method may lead to a correspondence between a lane and a control, but this may look unpleasant, or not suit the layout of a building.

A set of controls may be given a visual or audio cue, in such a way that the control bears some physical resemblance, similarity, or label, which prompts the user to find connection between each control and the corresponding lane. For example the foyer of a building may be drawn, and controls overlain upon the image in such a way that correspondence between each control and each lane can be seen by their relative positions within the real world foyer, and the foyer image. This method may use up a considerable amount of time.

Identification of correspondence by layout or labelling of controls and lanes does not remove the logical step of recognising the pattern which connects each control to each lane, and will often require considerable human input to 'setup' the system. This is particularly important due the fact that many end users will be contracted and must learn to use a system with little training, in a busy and stressful environment. Often lanes will not be distinguishable from one another, and controls will be labelled only by number and have no pattern of correspondence to the lanes. There is often considerable difficulty in remembering which direction corresponds to entry, and which to exit. Systems are often implemented in environments where building security is a high priority, but also people made to wait will be aggressive and angry.

Figure 1:
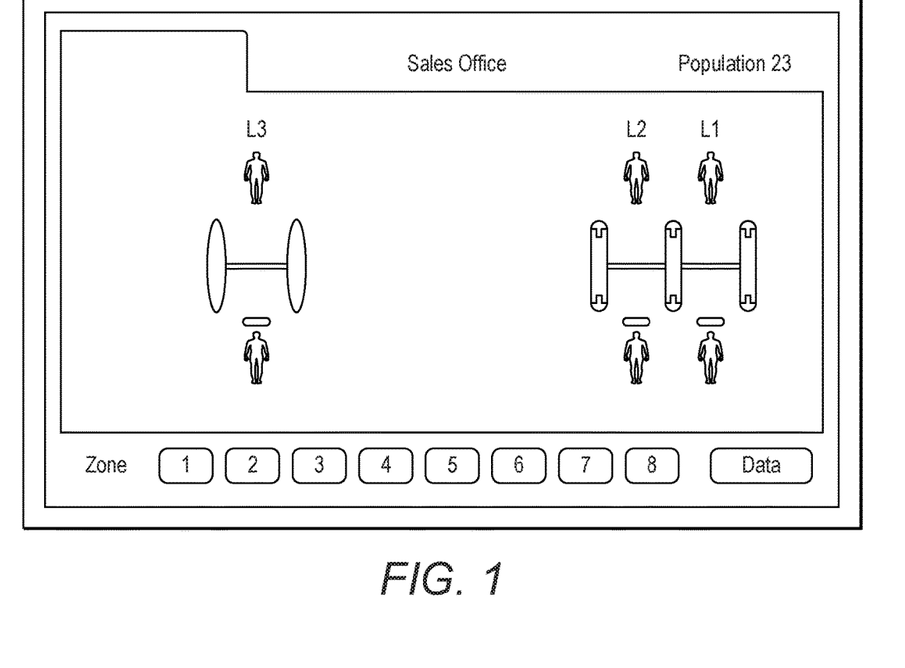
FIGS. 1 and 2 show previously proposed displays.
Figure 2:
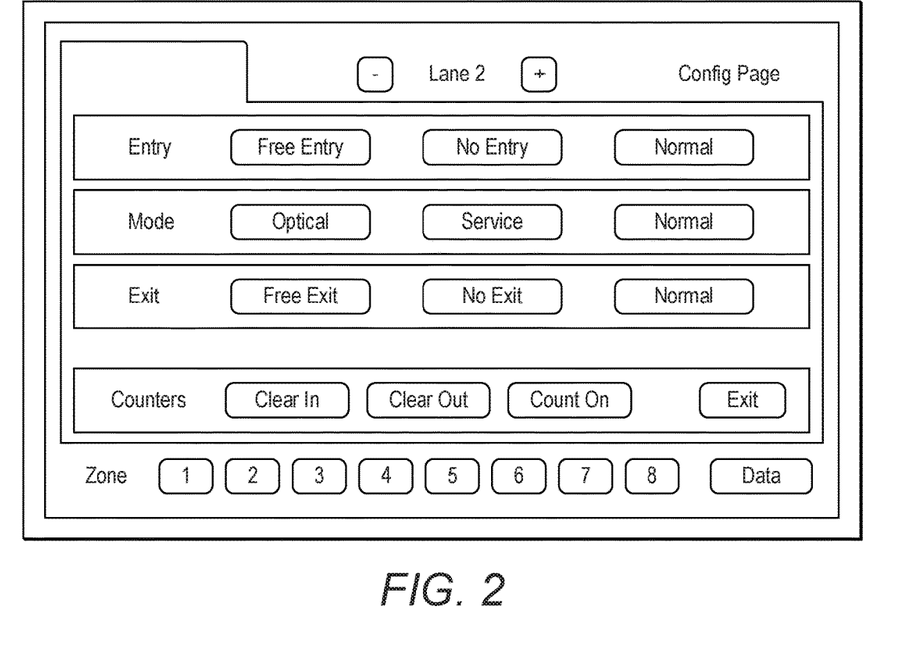

FIG. 1 shows a typical computer generated screen that a security officer will view, illustrating the three lanes L1, L2 and L3 very schematically. If the officer wishes to control one of the lanes he or she must bring up a separate screen (shown in FIG. 2) and press appropriate buttons to control the turnstiles (eg allow free entry, allow normal entry with entrance etc).

The present invention arose in an attempt to provide an improved remote turnstile controller.

According to the present invention there is provided a turnstile apparatus comprising a plurality of turnstile lanes, a camera mounted to view the lanes in its field of view and a remote controller, connected over a network to the camera and lanes, the controller having a display associated with it and means for controlling operation of the lanes, the camera being adapted to transmit video images of its field of view to the controller; the controller being adapted to display the video from the camera and further adapted to generate buttons, each button being associatable with a particular lane, the button being moveable to a position on the screen where it is in the vicinity of the lane, wherein operation of the button by a user controls operation of its associated lane, including operating a barrier, forming part of the lane, to open.

Alarm means may be provided such that if an alarm event occurs at one of the lanes, perhaps by someone attempting to enter without authorisation, then an alarm is actuated and displayed on the display, preferably displayed at a position where it indicates a particular lane and a video of the event is made available for viewing. The video may include video data before the event occurred.

In the present invention a camera is used, which can be placed in optional position where the field of view is unobscured.

The invention further provides a method of controlling a turnstile apparatus comprising a plurality turnstile lanes, providing a camera positioned to view the lanes, providing a control having a display associated with it and connected over a network to the lanes and camera, wherein, buttons are generated and displayed by the controller, each being associated with a lane, such that pressing a button on the display operated its associated lane, including operating a barrier forming part of the lane to open.

An advantage of the present invention is that the turnstiles are represented by a real image of the actual turnstile, preferably in real time, as opposed to a graphic representation and also can be viewed from any designated view point, including one which makes quickly understanding an alarm event or safely authorising and monitoring the passage of a visitor more intuitive.

Embodiments of the invention will now be described, by way of example only, with reference to the accompanying drawings.

Figure 3:
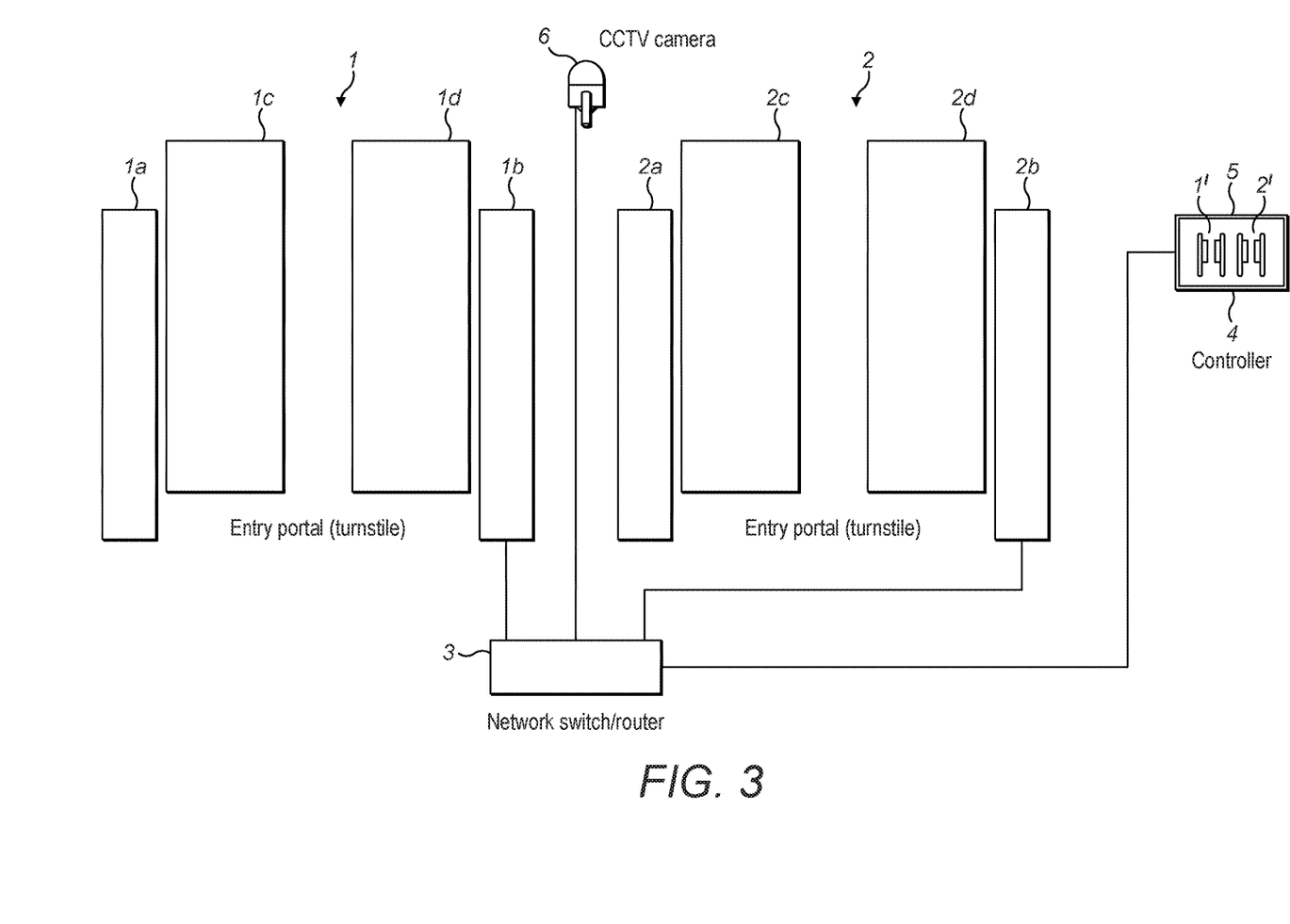
FIG. 3 shows a system with a camera.

Referring to FIG. 3 there is shown a remote turnstile controller and monitor adapted to control two entrance portals (turnstiles), 1 and 2. These each comprise pairs of elongate housings 1a, 1b, 2a, 2b which are spaced from one another as to define passageways between them, and glass barriers 1c, 1d, 2c, 2d which are rotatably mounted to the respective housing such that they can be controlled to open or close to allow a person access or not.

The turnstile control equipment is connected by a network switch router 3 to a controller 4 which includes (or has associated with it) a display 5. This may be a touchscreen. In one embodiment, the controller may be a network type PC, portable computer or tablet equipped with a display and network connected, via the network switch router 3, to the turnstiles. Note that where two turnstiles are shown in the Figure any number may be used in practise.

A video camera 6 is connected to the network as shown and this is positioned where desired. It may also be a camera that can take both video and still images. Typically, it may be located higher than the turnstiles in a position to obtain a birds eye view of the turnstile rather than a plan view. It may be directly above them, to obtain a plan view but this will not generally be preferred.

Thus, the positioning of the camera may be where a person wishing to monitor the system would ideally wish to be positioned. It may be positioned on the secured side of the turnstiles (ie the side into which the persons generally move such as the inside of a building for example) so that all the lanes are viewable and the faces of those seeking to enter can be seen via the camera. The entire image seen by the camera is therefore viewable, most preferably in real-time on screen 5 including the turnstiles (entry portals) as shown schematically by 1', 2' on the display 4, and also any people entering or exiting are viewed.

Figure 4:
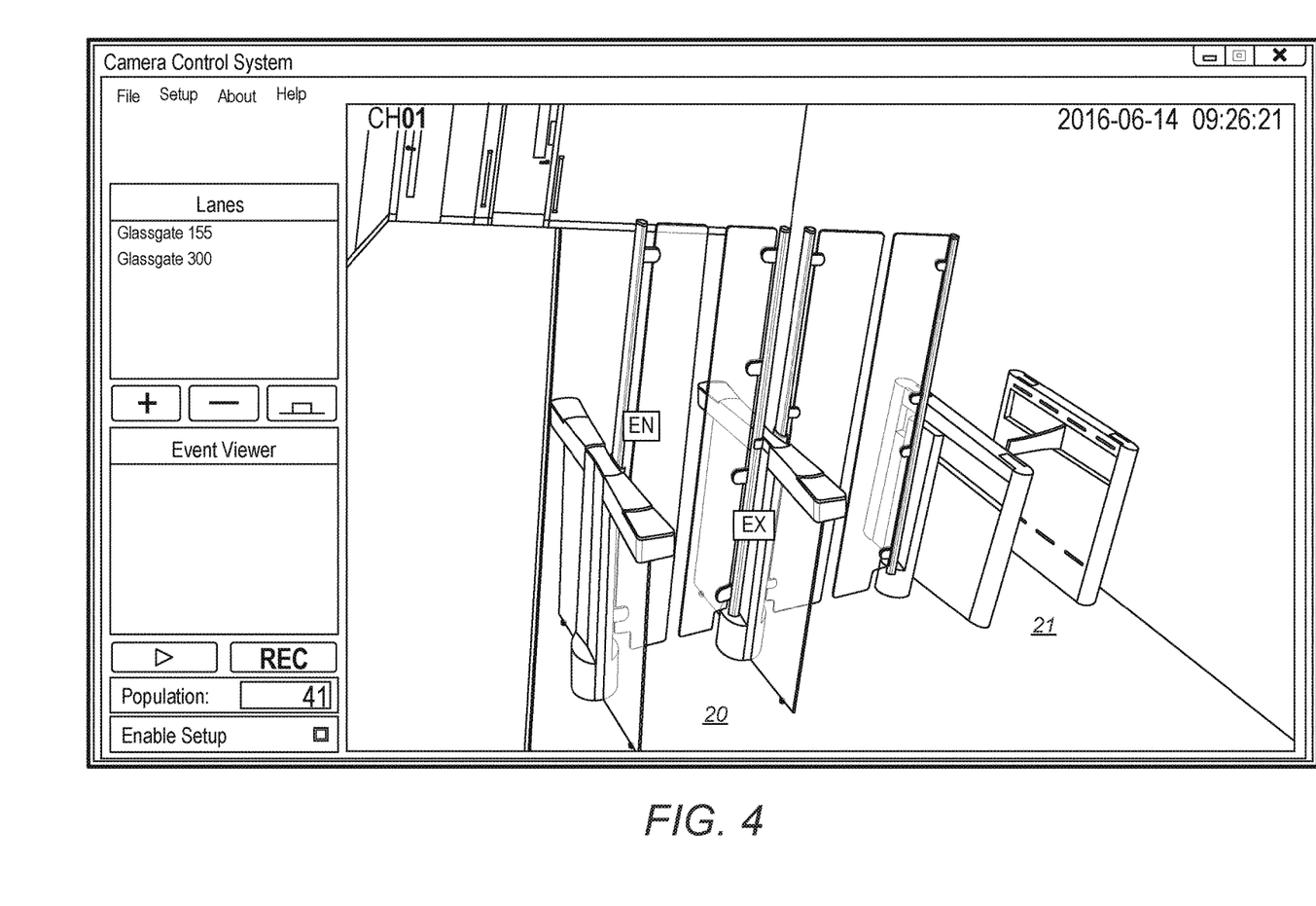
FIGS. 4 to 7 show displays.
Figure 5:
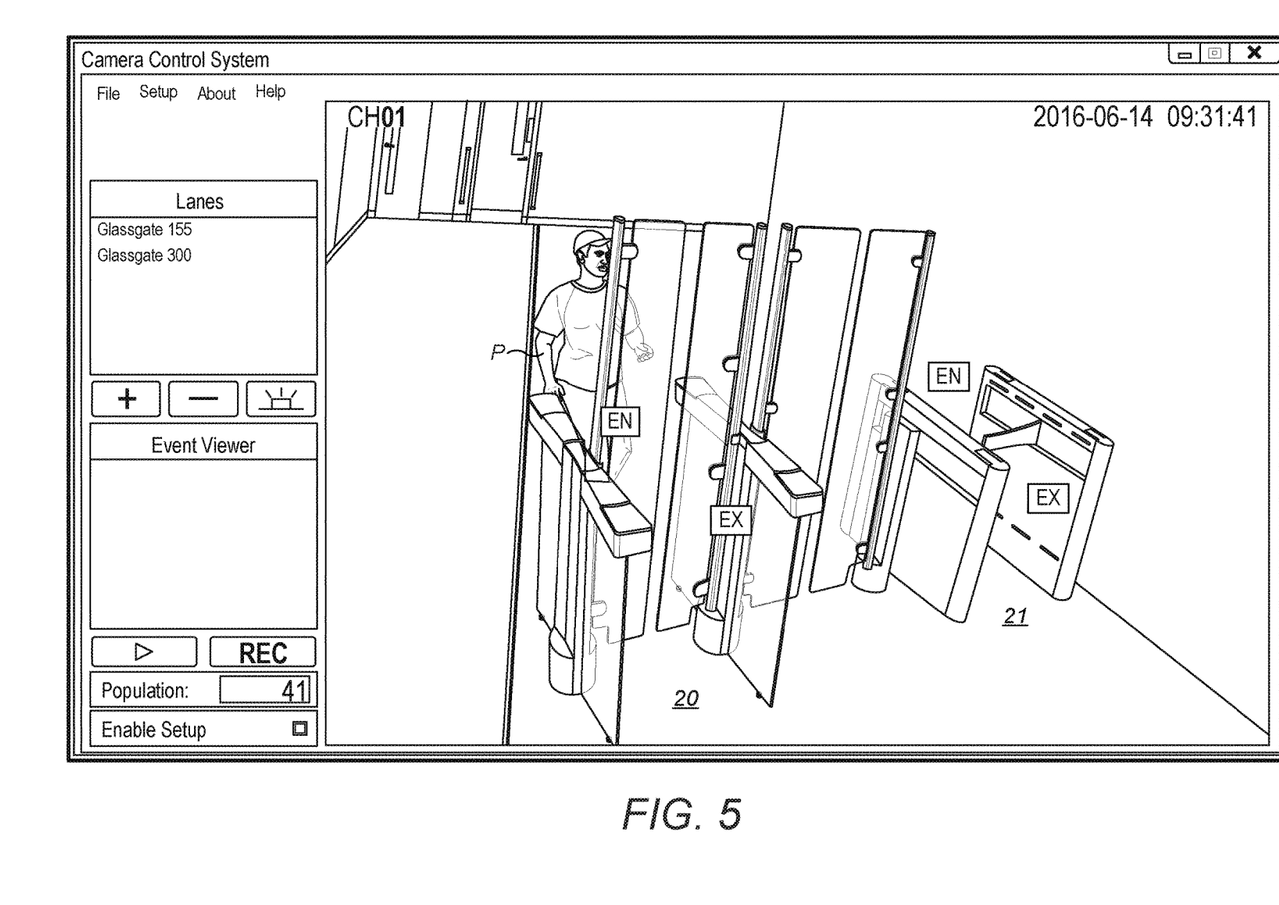

FIGS. 4 and 5 show example displays. FIG. 4 shows a display from a camera which is positioned slightly offset from and above two lanes. These are first lane 20 and the second lane 21, which are of different types in this embodiment. Note that in practise more than two lanes may of course be provided. Initially the video display from the camera will be displayed without any overlays. One task of a user is to add a lane. This instigates a connection between the controller and that particular lane. This may be done by using an "add lane function", in which the user adds a convenient name for the lane, the address of the lane (eg an IP address if the system is connected by an IP network) and perhaps also a user name and password. This connects the controller to that lane and control of devices and other network is well known. Thus, for example, the user may firstly add on lane 20 to the system and make connection with the local controller of lane 20, such that the main controller 4 can control functions of this.

After the lane is created then the controller may go into a set-up mode in which one or more buttons are displayed, typically at the side of the screen. These buttons are be pre-allocated, or subsequently allocated to that lane such that actuation of them, causes the controller to control the lane. The buttons may be moved by clicking and dragging them on the screen to desired positions. In this case, an Entry Button (EN) is moved to an entry side of Lane L20 on the display and an Exit Button (EX) is moved to the exit side of Lane L20. In the figure shown the exit side is the side nearest the viewer. Once moved into position, at a suitable region of the screen in the vicinity of where the actual lane 20 is shown then their positions may be fixed. Subsequently, by pressing upon the EN Button or EX Button various control actions can be taken. For example, if a user is seen in the display moving in the entry direction then a security officer viewing the screen may press the EN Button to allow the person entry if he knows him or her. Different types of touches on the buttons may evoke different control actions, such as free entry/access, or credential only entry/exit or alternatively a first touch of the button may cause a sub-window to be shown on another screen which provides a series of options.

The control options may comprise any one or more of enabling exit/entry, automatically enabling exit/entry (ie making the gate open rather than just enabling a user to open the gate), enabling entry/exit only when a credential is also replied to a credential reader, or biometric information is read, the generating of an alarm, a blocking function or many other types of control functions.

Because the buttons are displayed in the vicinity of a lane it is immediately clear to an officer which button to press.

In the example of FIG. 4, buttons are only shown on lane 20.

In the example of FIG. 5, lane 21 is also set into the system in addition to lane 20 and further EN and EX Buttons are displayed which can be pressed and used to control lane 21. Any number of lanes may have buttons allocated to, and associated with, them.

Figure 6:
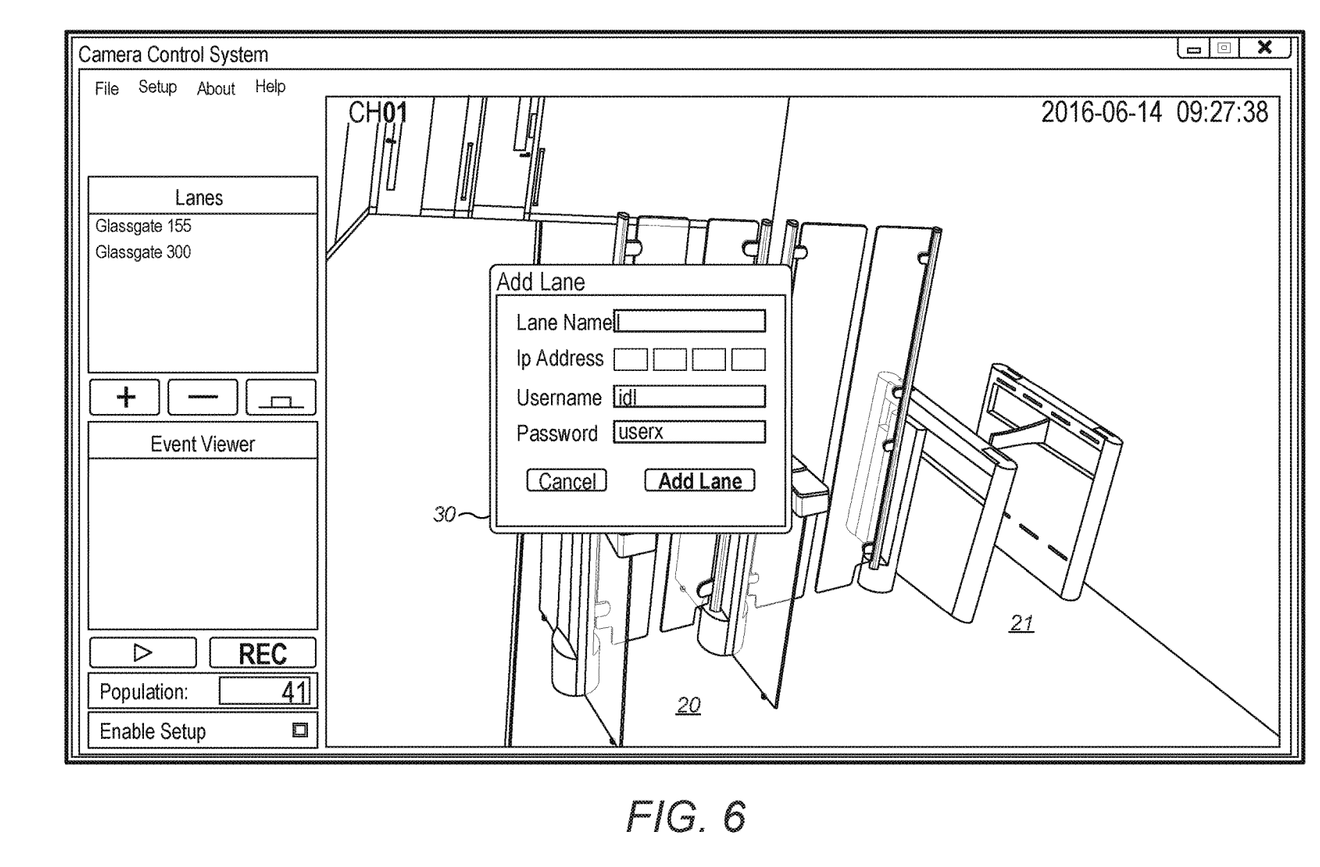

Note that the lane allocation may be done before the camera is linked to the system and video from the camera is displayed. FIG. 6 shows an example of lane allocation, with an 'Add Lane' window 30 shown.

Figure 7:
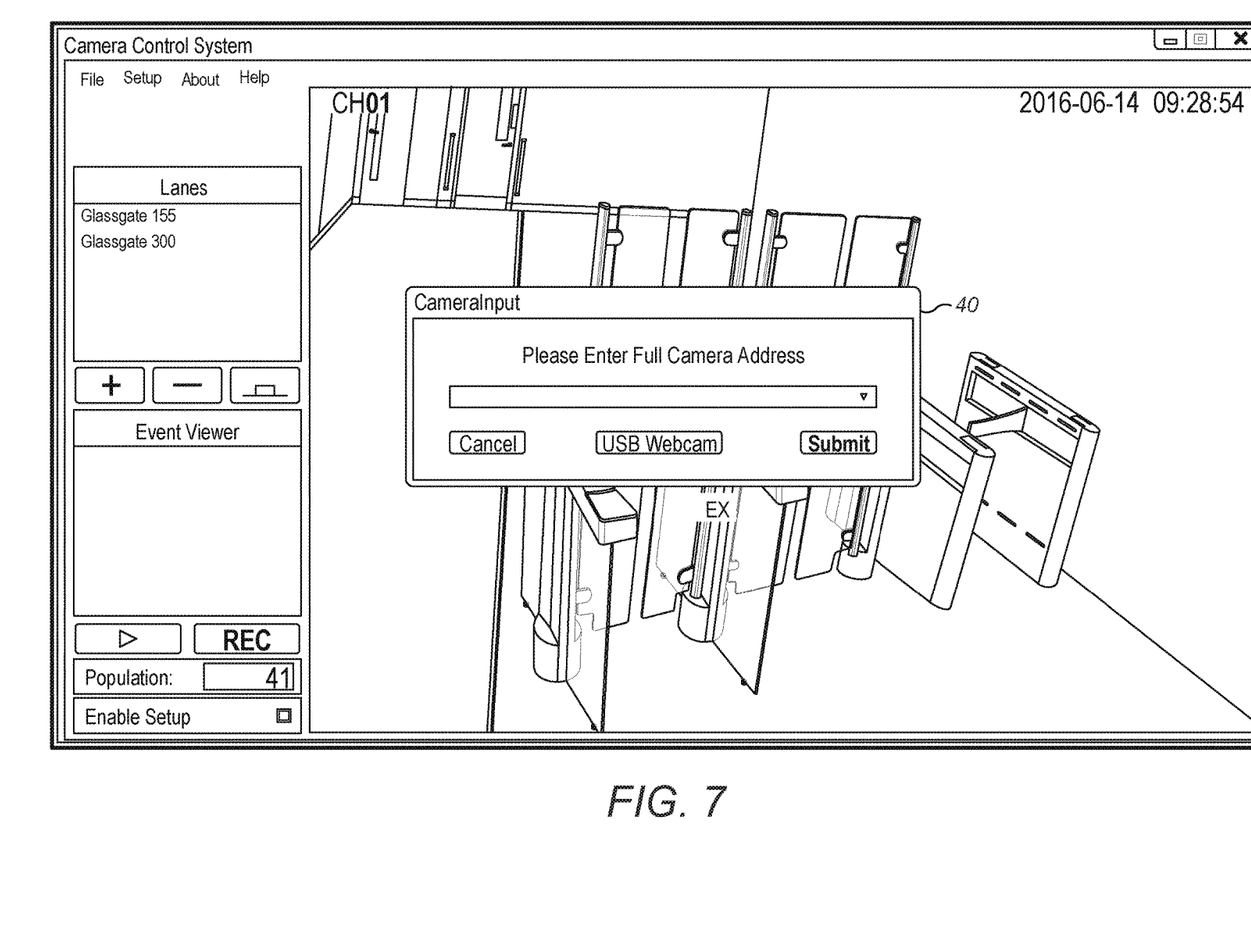

In a camera adding step (before or after lane adding) (FIG. 7) the user enters the network address of the camera (usually once the camera has been installed in place). An 'Add Camera' window 40 is shown. This address will typically be an RTSP address. Alternatively, the camera may be a USB camera or other types of camera. Once the camera has been entered onto the system then of course its details may be stored so they can be retrieved from a simple dropdown menu, for example. Once the address has been entered then the controller for attempts to communicate with the camera and once successful the video image can be displayed on the screen.

The EN Button and/or EX Button can be hidden if necessary, or selective ones hidden or shown if a user only wishes to be able to control one of the lanes in a multilane system, or for other reasons.

Instead of separate entry and exit buttons, only one button may be used if desired.

The user can of course see a person P approaching the system and the lanes can therefore take action before or as the user approaches a lane. The system can also generate alarms, either by the security officer believing an alarm situation is happening and therefore manually generating an alarm, or automatically. By using sufficiently intelligent software, the system may be arranged, for example, that if it detects that a person is approaching a lane but is not presenting an appropriate credential it may institute an alarm after a predetermined time period.

The controller preferably maintains a record of the video, such that in the event of an alarm a message can be displayed that there is an alarm and that a video is viewable so that the security guard can then view this video. The video viewable may last a predetermined time, for example. It may also begin from a period before the alarm event was actuated (eg two or three seconds before) so that a user can see the sequence of events leading up to the alarm (pre-alarm video) and for some period afterwards.

An alarm event typically will occur either when an alarm occurs in the lane, or if a manual record button REC 22 is pressed. Upon an alarm event occurring the programme typically begins recording the previous X (typically 2) seconds of video followed, for example, the next Y (typically 3) seconds, if the lane is in alarm (or eighteen seconds) if a manual record event has occurred.

Each type of alarm may produce a differently titled video, which specifies either manual recording or the specific name of the lane which is in alarm, followed by the time/date of the recording. The alarm event is then freely available to view.

The monitoring and control apparatus is provided with software enabling the turnstiles to be monitored by touches on the relevant parts of the display. Thus, the turnstile may be opened or closed, alarms actuated and so on when a user viewing the display sees events happening at the particular turnstile. By being able to press each individual turnstile he can control each turnstile separately.

Thus, the present invention provides a fast and intuitive interface in which control and monitoring of one or multiple turnstiles can be combined with real time and/or stored video or still photographs from a camera and which can view them and display them in real time from a recognisable and useful prospective. If the cameras are sufficiently high then the usual problem of a human monitoring a system from a desk and being blocked by persons from being able to see actual turnstiles, can be avoided or greatly reduced. By combing a camera view of the or each turnstile on a touchscreen, such as by touching or otherwise selecting a lane on the screen the or each turnstile can be controlled and monitored uniquely or in a group. In addition, the video displayed from the camera may be stored such that in the event of an alarm or other situation it is possible to automatically or quickly review in the event of serious incidents. A history of passage can be stored.

If the controller is used to manually authorise the passage of a person or persons through a turnstile then this can be done quickly and easily using a single screen. Previous solutions have involved one screen for control and another CCTV system simply used for displaying and which cannot be used for control or selection of anything.

Note that instead of one camera a plurality of cameras may be provided. This may be provided at a range of different locations and a range of different perspectives. Their images may be combined into one single display or separate displays, such as using separate windows or separate screens, may be used from the individual cameras. A user may be able to switch between the outputs from two or more differently located cameras, to see images from different perspectives when required.

If a security officer wishes to manually allow a person to pass through a turnstile at any stage he can simply select the lane by pressing or swiping its or one of its buttons for example and he will simultaneously see, in real time, the turnstile opening and allowing that person to pass. By using "swipe" movements a user/security officer can enable operation of a particular turnstile to allow passage in a particular direction by swiping the screen in that direction, eg "Entry" by swiping in one direction, and "Exit" by swiping in the other direction.

If an alarm condition occurs at one of the turnstiles, for example someone attempts to enter without authorisation, then a remote alarm may be indicted at the controller and this is preferably displayed at a location corresponding to the particular turnstile. Thus, the image of the turnstile may be arranged to flash red or a particular part of a display associated with that turnstile may be arranged to indicate the alarm condition visually. This can be done on the real time image from the camera and/or one of the series of stored images or video images leading up to the alarm. This could be a latched condition, meaning that the alarm signal continues to operate until cleared by a security officer.

A button can be any displayed image or icon, of whatever size, which can be pressed to control a lane. Indeed, it need not actually be visible; an area of the screen might be marked initially (by the user marking an area of it in the vicinity of a displayed lane) and then any press in that area acts as "a button" press.

An alarm or other event may automatically trigger recording of the video. It may also record events happening at the touchscreen so that a history of actions taken by a user is stored along with the actual video footage.

A wireless network may be used instead of, or in addition to, a wired one.

Multiple remote turnstile controllers may be used, each perhaps monitored by a separate person at a different location.

The invention claimed is:

1. Turnstile apparatus comprising a plurality of turnstile lanes, a camera mounted to view the lanes in its field of view and a remote controller, connected over a network to, and located at a separate location from, the camera and lanes, the controller having a display associated with it and means for controlling operation of the lanes, the camera being adapted to transmit video images of its field of view to the controller; the controller being adapted to display the video from the camera including a real-time image of the turnstile lanes and further adapted to generate buttons digitally overlaid upon the real-time image of the turnstile lanes, each button being associatable with a particular lane, the button being moveable to a position on the screen where it is in the vicinity of the lane, wherein operation of the button by a user controls operation of its associated lane, including operating a barrier, forming part of the lane, to open.

2. Apparatus as claimed in claim 1, wherein a plurality of lanes have buttons associated with them.

3. Apparatus as claimed in claim 1, where an entry and an exit button is generated for the lanes, to operate the lanes to open in an entry or exit direction respectively.

4. Apparatus as claimed in claim 1 wherein the controlling comprises any one or more of enabling free entry and/or exit, enabling entry and/or exit upon the presentation of a credential or biometric data generating an alarm and/or locking entry and/or exit.

5. Apparatus as claimed in claim 1 wherein the display is a touch screen such that the user touches a button to control its associated lane.

6. Apparatus as claimed in claim 5 wherein the user uses a pointing device such a mouse to touch the button.

7. Apparatus as claimed in claim 1 wherein after a button is generated and associated with a particular turnstile, the button is freely moveable by the user to the desired position, such as in the vicinity of a particular lane.

8. Apparatus as claimed in claim 1 comprising two buttons associated with each lane, one associated with entry functions and the other associated with exit functions.

9. Apparatus as claimed in claim 1 comprising means for storing and subsequently displaying stored video information when triggered by an event relating to a lane.

10. Apparatus as claimed in claim 1 comprising means for storing video and/or still images.

11. Apparatus as claimed in claim 10 wherein video of a predetermined time period commencing before an event is triggered is displayed upon the event being triggered or made available for display.

12. Apparatus as claimed in claim 1 comprising a plurality of cameras positioned at different locations.

13. Apparatus as claimed in claim 12 where a user can select which camera images is displayed and used for monitoring and controlling at any time.

14. Apparatus as claimed in claim 1 comprising multiple remote turnstile controllers.

15. Apparatus as claimed in claim 1 claim the camera is positioned in a direction such that persons entering into a secured side of the portal face said camera.

16. Apparatus as claimed in claim 1 wherein the camera is positioned to obtain a birds eye view of the or each turnstile.

17. A method of controlling a turnstile apparatus comprising a plurality turnstile lanes, providing a camera positioned to view the lanes in real-time, providing a control having a display associated with it and connected over a network to, and located at a separate location from, the lanes and camera, wherein, buttons are generated digitally and displayed overlaid upon a real-time image of the turnstile lanes by the controller, each being associated with a lane, such that pressing a button on the display operates its associated lane, including causing operation of a barrier forming part of the lane to open.

* * * * *